United States Patent
Benveniste

(10) Patent No.: US 8,243,710 B1
(45) Date of Patent: Aug. 14, 2012

(54) METHOD AND APPARATUS PERFORMING EXPRESS FORWARDING

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1206 days.

(21) Appl. No.: 12/037,505

(22) Filed: Feb. 26, 2008

Related U.S. Application Data

(60) Provisional application No. 61/021,231, filed on Jan. 15, 2008, provisional application No. 60/938,340, filed on May 16, 2007, provisional application No. 60/917,283, filed on May 10, 2007, provisional application No. 60/914,868, filed on Apr. 30, 2007, provisional application No. 60/903,307, filed on Feb. 26, 2007.

(51) Int. Cl.
*H04J 1/00* (2006.01)

(52) U.S. Cl. ........ 370/344; 370/310; 370/343; 370/351; 370/389; 370/396; 370/395.21; 370/395.4; 370/395.42

(58) Field of Classification Search ........................ None
See application file for complete search history.

(56) References Cited

U.S. PATENT DOCUMENTS

| | | | | |
|---|---|---|---|---|
| 7,095,732 | B1 * | 8/2006 | Watson, Jr. | 370/346 |
| 7,274,676 | B2 * | 9/2007 | Cardei et al. | 370/328 |
| 7,310,339 | B1 * | 12/2007 | Powers et al. | 370/394 |
| 7,813,348 | B1 * | 10/2010 | Gupta et al. | 370/394 |
| 2005/0058151 | A1 * | 3/2005 | Yeh | 370/445 |
| 2005/0100010 | A1 * | 5/2005 | Jain et al. | 370/389 |
| 2006/0114878 | A1 * | 6/2006 | Choe et al. | 370/346 |
| 2007/0076742 | A1 * | 4/2007 | Du et al. | 370/445 |

* cited by examiner

*Primary Examiner* — Hassan Phillips
*Assistant Examiner* — Gautam Sharma
(74) *Attorney, Agent, or Firm* — Chapin IP Law, LLC

(57) ABSTRACT

A method, apparatus and computer program product for the express forwarding are presented. A timer (NAV) is maintained at each respective node of a wireless LAN. A frame is designated as a TSQ frame to be express forwarded from a first node to a second node. A duration field of the frame is incremented by a first predetermined time increment (DT0) before the TSQ frame is forwarded and the TSQ frame is forwarded by the first node to the second node. A response is received from the second node wherein non-forwarding neighboring nodes each set their NAV according to a value equal to the duration field of the response. The second node attempts transmission of the TSQ frame when acknowledgement of receipt of the TSQ frame is complete.

18 Claims, 8 Drawing Sheets

METHOD AND APPARATUS PERFORMING EXPRESS FORWARDING

CROSS REFERENCE TO RELATED APPLICATIONS

The present application claims the benefit of U.S. Provisional Patent Applications No. 60/903,307, filed on Feb. 26, 2007; U.S. Provisional Patent Application No. 60/914,868, filed on Apr. 30, 2007; U.S. Provisional Patent Application No. 60/917,283, filed on May 10, 2007; U.S. Provisional Patent Application No. 60/938,340, filed on May 16, 2007; and U.S. Provisional Patent Application No. 61/021,231, filed on Jan. 15, 2008 all of which are incorporated herein by reference in their entirety.

BACKGROUND

Wireless Local Area Networks (WLANS) have become ubiquitous. Growth in demand for Wireless Local Area Networks (WLANs) is driving the development of new technology to provide higher throughput. To a greater extent this growth is due to the increased number of users and applications desiring wireless transmission and to a lesser extent to the emergence of new applications needing higher transmission rates along a single connection between two points.

In wireless Local Area Networks (LANs), a wireless channel can be reserved for the transmission of a single frame or of a sequence of frames, known as a TXOP (transmit opportunity), while employing asynchronous distributed random channel access methods, as described in the 2007 802.11 standard, which includes the 11e amendment, where the TXOP was introduced, the IEEE Std 802.11™-2007, (Revision of IEEE Std 802.11-1999), and the Wireless LAN Medium Access Control (MAC) and Physical Layer (PHY) Specifications.

In such an environment, both the source and destination of the transmission broadcast the reservation duration in order to establish the interference neighborhood. A TXOP is a sequence of frames transmitted between a pair of nodes following a single contention for the channel. A TXOP holder, the node initiating the TXOP, may transmit contention-free after the first transmission to the Responder, which is the node receiving the frames in the TXOP.

To date, there are two basic ways of reserving the channel for a TXOP in wireless LANs. One method of performing reservation is by utilizing Frame-by-frame reservation. According to the 802.11 distributed channel access MAC protocol, RTS/CTS frames are used to notify neighbors of the start of the reservation.

Alternatively, the first frame of a TXOP has its duration field set to a time interval long enough to reserve the channel for the transmission of the following frame. The reservation time is extended on a frame-by-frame basis, by updating the length of the reservation with each data frame and the acknowledgement that follows. A consequence of frame-by-frame reservation is that, if the reservation is denied, it does not require cancellation.

Another method of performing reservation in wireless LANS is by utilizing Start-to-finish reservation. If it is not be possible to extend the time of channel reservation on a frame-by-frame basis, the channel must be reserved for the entire sequence of transmissions, start to finish, at the time of the reservation request, and, if the reservation request is denied, or if time remains reserved at the completion of transmission, the reservation must be cancelled.

A start-to-finish reservation applies to any combination of nodes (i.e. mesh points/APs/stations). A node reserves a channel to cover an entire sequence of transmissions, directed to either one or various different destinations, possibly including responses from the destinations. If the reservation is not authorized, or when the transmission sequence is completed, the reserving node releases the remaining reservation time by canceling the reservation.

To avoid collisions, each node keeps a NAV for a traffic channel, which is set according to the received reservation requests and responses. A NAV is defined as a time period a node must refrain from transmitting on a traffic channel. It is maintained by each station and is updated by the Duration field value of received transmissions, which may serve as TXOP reservation requests or responses to reservation requests. A reservation request from the transmissions source is either granted or denied by the destination, and notice is sent to the source. The response contains in the Duration field the remaining reservation duration in order to notify the neighbors of the destination node. Applications for wireless networks include Voice Over Internet Protocol (VoIP). and multimedia (Voice and/or Video), together referred to as VoIP/multimedia. VoIP/multimedia applications require a certain Quality of Service (QoS) in order to maintain sufficient quality of the communication. Latency can be an issue for VoIP/multi-media. Meeting QoS requires short total end-to-end over-the-air delays. The 802.11e amendment to the IEEE 802.11 standard, which is incorporated in the 2007 revision of the standard, provides mechanisms for reducing the over-the-air delays from transmissions in a wireless LAN. These are single hop transmissions. The 802.11e mechanisms may not be adequate for meeting latency requirements in wireless networks involving multiple-hop transmissions. Wireless mesh networks are such networks. A wireless mesh may be an Ad hoc mode mesh (not attached to a wired network) or an infrastructure mode mesh (attached to a wired network). In general, both traffic with source and destination in the mesh and traffic bound from/to a wired network may co-exist on a mesh. The latency/jitter limit for voice traffic traversing the wired network is lower (40 to 50 milliseconds) than that for traffic staying on the wireless mesh (175-200 milliseconds).

A mesh will involve multiple-hop flows. The mesh backbone network is a multi-hop network. The multi-hop path delay will be at least a multiple of the single hop delay. Wireless meshes operating on a single channel have novel collision behavior that can impact nearby the latency experienced end to end, over the air. The prevalence of hidden nodes and the interaction of contention-based access with multi-hop flows impose latency increases on both mesh and nearby WLANs beyond what non-mesh experience suggests. Hidden nodes remain hidden after retrial, and their transmissions are dropped. The high correlation of sequentially forwarded frames on a multi-hop flow cause excessive delays to transmissions that have been involved in a collision. For backward compatibility, and for the contention-based access protocol to continue to be used, remedies are needed on the mesh side. For QoS traffic, multi-hop delay must meet the same latency constraints as single-hop delay. We describe remedies to reduce over-the-air latency. The goal is to reduce the delay experienced on the longest multi-hop path by forwarding frames along a multi-hop path fast.

SUMMARY

One way to reduce delay in a wireless mesh is by providing capacity provisioning. The nodes and links of the mesh network must have sufficient capacity to prevent traffic buffer from building up anywhere in the network. Proper provisioning involves the use of multiple radios at nodes of high traffic concentration to match traffic profiles.

Another way to reduce delay in wireless mesh is by providing congestion control. Reducing transmit rate and rerouting traffic can alleviate congestion, given the provisioning. Even with proper provisioning, the stochastic nature of traffic may produce short-term fluctuations which may cause congestion at certain nodes.

MAC layer prioritized transmission of forwarded QoS traffic across the mesh helps reduce end-to-end delay along a multi-hop path, given congestion control and capacity provisioning. For fast forwarding, QoS traffic would require top priority access when forwarded on a multi-hop path. Lower priority access would be used for all other traffic. EDCA offers access prioritization on a single channel. Further prioritization is not possible with EDCA, however. Higher-priority 802.11e traffic (VO/VI) already uses the top-priority access category. A different mechanism is needed for forwarded QoS traffic.

Conventional mechanisms such as those explained above suffer from a variety of deficiencies. Embodiments of the invention significantly overcome such deficiencies and provide mechanisms and techniques that provide for express forwarding of frames designated as time-sensitive QoS (TSQ) frames.

In a particular embodiment of a method for providing express forwarding of frames, the method includes maintaining at each respective node of a plurality of nodes of a wireless LAN, a timer (NAV) set to a corresponding time period during which the respective node must refrain from transmitting on a channel. The method also includes designating a frame as a TSQ frame to be express forwarded from a first node to a second node of the plurality of nodes and incrementing a duration field of the TSQ frame by a first predetermined time increment (DT0) before the TSQ frame is forwarded by the first node wherein non-forwarding neighboring nodes of the plurality of nodes each set their NAV according to a value equal to the duration field of the forwarded TSQ frame. The method further includes forwarding the TSQ frame by the first node to the second node wherein non-forwarding neighboring nodes of the plurality of nodes each set their NAV according to a value equal to the duration field of the forwarded TSQ frame, and receiving a response from the second node wherein non-forwarding neighboring nodes of the plurality of nodes each set their NAV according to a value equal to the duration field of the response. The method additionally includes wherein the second node attempts transmission of the received TSQ frame when acknowledgement of receipt of the TSQ frame is complete.

Another embodiment comprises a method of providing multi-channel express forwarding. In this particular embodiment the method begins with attempting to send a CC-RTS on a control channel. Next, a determination is made regarding when a data channel is busy and the data channel's NAV is not due to expire within an advance interval for reservation (AIFR) interval, then refraining from one of the group comprising transmitting and decrementing a backoff delay. Additionally this method includes when the data channel is not busy or the data channel is busy and the data channel's NAV is not due to expire within an AIFR interval then performing one of the group comprising transmitting and decrementing a backoff delay and wherein the AIFR length is dependent on an access priority of the CC-RTS. The highest priority, that is, longest AIFR duration, is used for forwarding TSQ data on a data channel. If a data channel is sought to forward a TSQ frame/TXOP, the CC-RTS is attempted by using the longest AIFR duration. When TSQ data is forwarded on the control channel, the procedure for express forwarding with a single channel is followed.

Still another embodiment relates to a method of providing Residual Lifetime (RLT) based express forwarding. A particular embodiment of this method includes receiving a frame into a wireless network. The method further includes adding a RLT value to a clock time of the node receiving the frame to produce an expiration time (ET) for the frame and including the ET in the frame. The method additionally includes forwarding the frame to a next hop node and at each next hop node determining a new residual lifetime of the frame, the new residual lifetime of the frame comprising a difference between the ET and the clock time of the node. The method further includes when a new residual time is less than a predetermined value, designating the frame as a TSQ frame. The frame designation is adjusted for the residual life of the frame. A frame with remaining lifetime below a specified threshold will have its designation changed to TSQ. Express forwarding frames based on age reduces the delay in traversing the wireless network and increases throughput (reduces dropped-frame rate).

Yet still another embodiment comprises a method of providing Time-To-Live (TTL) based express forwarding. A particular embodiment of this method includes maintaining the age (HN) of a frame. The method also includes refraining from designating the frame as a TSQ frame until the FIN reaches a predetermined value (HNEF). This method also includes when the HN reaches the predetermined value, designating the frame as a TSQ frame and express forwarding it. That is, incrementing a duration field of the TSQ frame by a first predetermined time increment (DT0) before the TSQ frame is forwarded. At each node the delay experienced by the frame, or age of the frame, is updated by adding to it the difference between the frame's time stamp and the node's clock time. Alternatively, the age FIN of the frame can be derived from the value of the TTL field by subtracting the former from the value MeshTTL at which the TTL is initialized when the frame is generated. At each node the TTL of the frame is updated by subtracting from it the difference between the frame's time stamp and the node's clock time. Thus, a frame is designated TSQ when TTL becomes less than or equal to MeshTTL−HNEF. Finally, the number of traversed hops can be used as a surrogate for the age of the frame. A frame will thus be designated TSQ if it has traversed a specified number of hops.

Other embodiments include a computer readable medium having computer readable code thereon for providing express forwarding of frames. The computer readable medium includes instructions for maintaining at each respective node of a plurality of nodes of a wireless LAN, a timer (NAV) set to a corresponding time period during which the respective node must refrain from transmitting on a channel. The computer readable medium further includes instructions for designating a frame as a TSQ frame to be express forwarded from a first node to a second node of the plurality of nodes. The computer readable medium also includes instructions for incrementing a duration field of the TSQ frame by a first predetermined time increment (DT0) before the TSQ frame is forwarded by the first node, and instructions for forwarding the TSQ frame by the first node to the second node wherein non-forwarding neighboring nodes of the plurality of nodes each updating their NAV according to the value of the duration field of the TSQ frame. The computer readable medium further includes instructions for receiving a response from the second node wherein non-forwarding neighboring nodes of the plurality of nodes each updating their NAV according to the value of the duration field of the response. The computer readable medium additionally includes instructions wherein the second node attempts transmission of the received TSQ frame when acknowledgement of receipt of the TSQ frame is complete.

Another embodiment comprises a computer readable medium having computer readable code thereon for providing multi-channel express forwarding. In this particular embodiment the computer readable medium includes instructions for attempting to send a CC-RTS on a control channel. The computer readable medium also includes instructions for determining when the data channel is busy and the data channel's NAV is not due to expire within an advance interval for reservation (AIFR) interval then refraining from one of the group comprising transmitting and decrementing a backoff delay. Additionally the computer readable medium method includes instructions for when the data channel is not busy or the data channel is busy and the data channel's NAV is not due to expire within an AIFR interval then performing one of the group comprising transmitting and decrementing a backoff delay and wherein the AIFR length is dependent on an access priority of the CC-RTS. The highest priority, that is, longest AIFR duration, is used for forwarding TSQ data on a data channel. If a data channel is sought to forward a TSQ frame/TXOP, the CC-RTS is attempted by using the longest AIFR duration. When TSQ data is forwarded on the control channel, the procedure for express forwarding with a single channel is followed.

Still another embodiment relates to computer readable medium including instructions for providing Residual Lifetime (RLT) based express forwarding. In a particular embodiment the computer readable medium includes instructions for receiving a frame into a wireless network. The computer readable medium further includes instructions for adding a RLT value to a clock time of the node receiving the frame to produce an expiration time (ET) for the frame and including the ET in the frame. The computer readable medium additionally includes instructions for forwarding the frame to a next hop node and at each next hop node determining a new residual lifetime of the frame, the new residual lifetime of the frame comprising a difference between the ET and the clock time of the node. The computer readable medium further includes instructions for when a new residual time is less than a predetermined value, designating the frame as a TSQ frame. The frame designation is adjusted for the residual life of the frame. A frame with remaining lifetime below a specified threshold will have its designation changed to TSQ. Express forwarding frames based on age reduces the delay in traversing the wireless network and increases throughput (reduces dropped-frame rate).

Yet still another embodiment comprises a computer readable medium having instructions for providing Time-to-Live (TTL) based express forwarding. In a particular embodiment the computer readable medium includes instructions for maintaining the age (HN) of a frame. The computer readable medium also includes instructions for refraining from designating the frame as a TSQ frame until the FIN reaches a predetermined value (HNEF). The computer readable medium also includes instructions for when the FIN reaches the predetermined value, designating the frame as a TSQ frame and express forwarding it. That is, incrementing a duration field of the TSQ frame by a first predetermined time increment (DT0) before the TSQ frame is forwarded. At each node the delay experienced by the frame, or age of the frame, is updated by adding to it the difference between the frame's time stamp and the node's clock time. Alternatively, the age FIN of the frame can be derived from the value of the TTL field by subtracting the former from the value MeshTTL at which the TTL is initialized when the frame is generated. At each node the TTL of the frame is updated by subtracting from it the difference between the frame's time stamp and the node's clock time. Thus, a frame is designated TSQ when TTL becomes less than or equal to MeshTTL−HNEF. Finally, the number of traversed hops can be used as a surrogate for the age of the frame. A frame will thus be designated TSQ if it has traversed a specified number of hops.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides express forwarding as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing express forwarding as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Express forwarding is a technique used to reduce delay for a designated frame along a multi-hop path by insuring that a forwarding node incurs less delay than single-hop transmissions. For a single-channel mesh forwarding delay is reduced by reserving the channel for a forwarded transmission for a sufficiently long time interval to enable the next forwarding node to seize the channel. Immediate access is thus given to nodes, other than the first node on a multi-hop path, forwarding QoS traffic.

A frame to be express forwarded is designated as a time-sensitive QoS (TSQ) transmission. A special flag may be used to mark a transmission as express forwarded, depending on the criteria for a TSQ transmission and/or the information available along its path. The TSQ designation may be supplied by the application, for example, a TSQ frame could be a frame of a specified user priority (e.g. VO). Alternatively, the TSQ designation may also be supplied by the originating node, for example, if there is differentiation between ad hoc and infrastructure traffic, all voice frames starting or destined to the portal would be designated TSQ by the originating node. The TSQ designation can further be used for other criteria.

In order to process an express forwarded frame, a known time increment DT0 is added to the value of the Duration field when a TSQ frame is forwarded. The Duration field of the ACK (if any) returned for the TSQ frame received at the destination node is set based on the Duration field of the received frame. All nodes that hear the transmission other than the receiving node set their NAV according to the Duration field of the received transmission. If the receiving node forwards the frame, it subtracts DT0 from the Duration value of a received frame before setting its NAV, and attempts transmission of the received TSQ frame when acknowledgement of receipt of thew TSQ frame is complete. DT0 should be sufficiently long to enable a forwarding node to process the received frame and prepare it for transmission on the next hop. It must be at least a time slot long.

An alternative (and more efficient) implementation will not add DT0 to the Duration value of the frame transmitted on the last hop (i.e. to the final destination MP).

Figure 1:
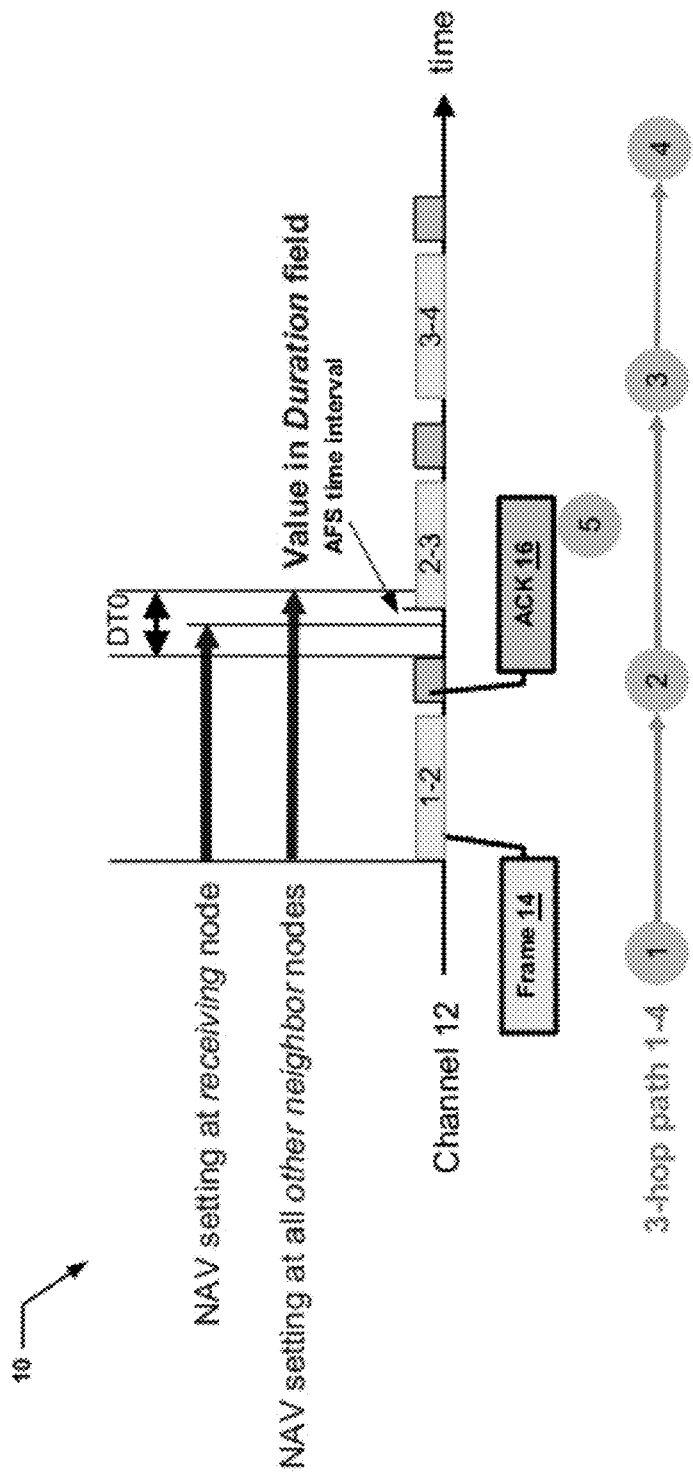
FIG. 1 a diagram showing the timing of an express forwarded frame among several nodes is shown.

Referring now to FIG. 1, a diagram 10 showing the timing of an express forwarded frame among several nodes is shown. Nodes 1-5 are shown, with a three-hop path for an express forwarded frame traversing from node 1 to node 2, node 2 to node 3 and then node 3 to node 4. Node 5 is a non-forwarding neighbor node. Each node maintains a NAV for the channel 12. A first frame 14 is designated as an express forwarded frame, to be forwarded from node 1 to node 2. The Duration field is set at value longer than usual when a frame is transmitted to a forwarding node of a multi-hop path. The forwarding nodes, 2 and 3, transmit when they complete acknowledgment of the received frame. In an alternative embodiment of this invention, the forwarding nodes, 2 and 3, adjust the Duration value on the received frame by subtracting the increment when setting their NAV. The non-forwarding neighbor nodes—e.g. node 5—sets its NAV by the received Duration field. Thus, node 2, as the intended recipient of the forwarded frame does not set its NAV. Accordingly, node 2 will have access to channel 12 before node 5 does, and the frame will be forwarded more quickly, since node 2 can access the channel before node 5 and forward the frame. Thus, node 2 may transmit when transmission and acknowledgment are completed, whereas the NAV at node 5, which was set to the value of the Duration field, has the value DT0 when the received frame has been acknowledged.

Contention is reduced when forwarding a TSQ frame for all forwarding nodes other than the first node on path. Neighbor nodes have their NAV still set to at least one time slot when the new forwarding node is ready to transmit (barring any independent NAV-setting request); thus they will not contend for the channel, letting that node transmit before any of them.

A forwarding node may perform Controlled Channel Access (CCA) before attempting transmission. This avoids collisions with another node that has not heard the received TSQ transmission to set the NAV accordingly. If the channel is busy, the forwarding node backs off a delay from a short contention window CWmin(EF).

TXOPs allow multiple frames to be transmitted with a single contention. TXOPs can be used together with express forwarding. The combination reduces contention and collisions along the forwarding path. The Duration field value on each frame of a TXOP to be forwarded is increased by DT0. A TXOP may contain exclusively TSQ frames, or a mix of frames, some to be express forwarded and other not. The frames to be express forwarded are flagged as TSQ. Preferably the TSQ frames of a TXOP should be transmitted before the non-TSQ frames in order to reduce the processing delay of the TSQ frames at the receiving node and thus enable their immediate forwarding. All TSQ frames in a given TXOP shall be transmitted to the same node. The Duration field on the ACK (if any) for each of the TXOP frames received at the destination node is set based on received frame. The receiving node will be able to transmit immediately following the completion and acknowledgment of the TXOP. Forwarding of the frames in the received TXOP starts when the NAV expires, which occurs once the entire TXOP has been received and acknowledged. Forwarding of the frames in the received TXOP may involve the segregation of the frames into different TXOPs according to the next hop destination node. Frames buffered at the receiving node in the same access category as the received TXOP may be transmitted in the forwarded TXOPs, provided such frames are sent to the same node as the forwarded TXOP and the size of the augmented TXOP does not exceed the TXOP limit for the access category.

RTS/CTS is the mechanism for reducing the impact of hidden terminals, which are common in a wireless mesh. RTS/CTS protection may be used in conjunction with express forwarding. The combination reduces contention and collisions on the forwarding path. The RTS of a time-sensitive QoS frame is flagged TSQ and the Duration field on the RTS is increased by the increment DT0. The node to which the RTS is addressed responds with a CTS with Duration value set based on the Duration field of the received RTS. If the node receiving the RTS must forward the RTS-protected frame(s), it does so upon acknowledgement of the RTS-protected frame(s). Forwarding of the received frame or TXOP starts when the NAV expires, which occurs once the frame or TXOP has been received and acknowledged. The express forwarding mechanism works even when the receiving node is not required to observe its NAV after acknowledging receipt of a frame. Express forwarding gives priority access to frames marked TSQ over all other traffic.

Figure 2:
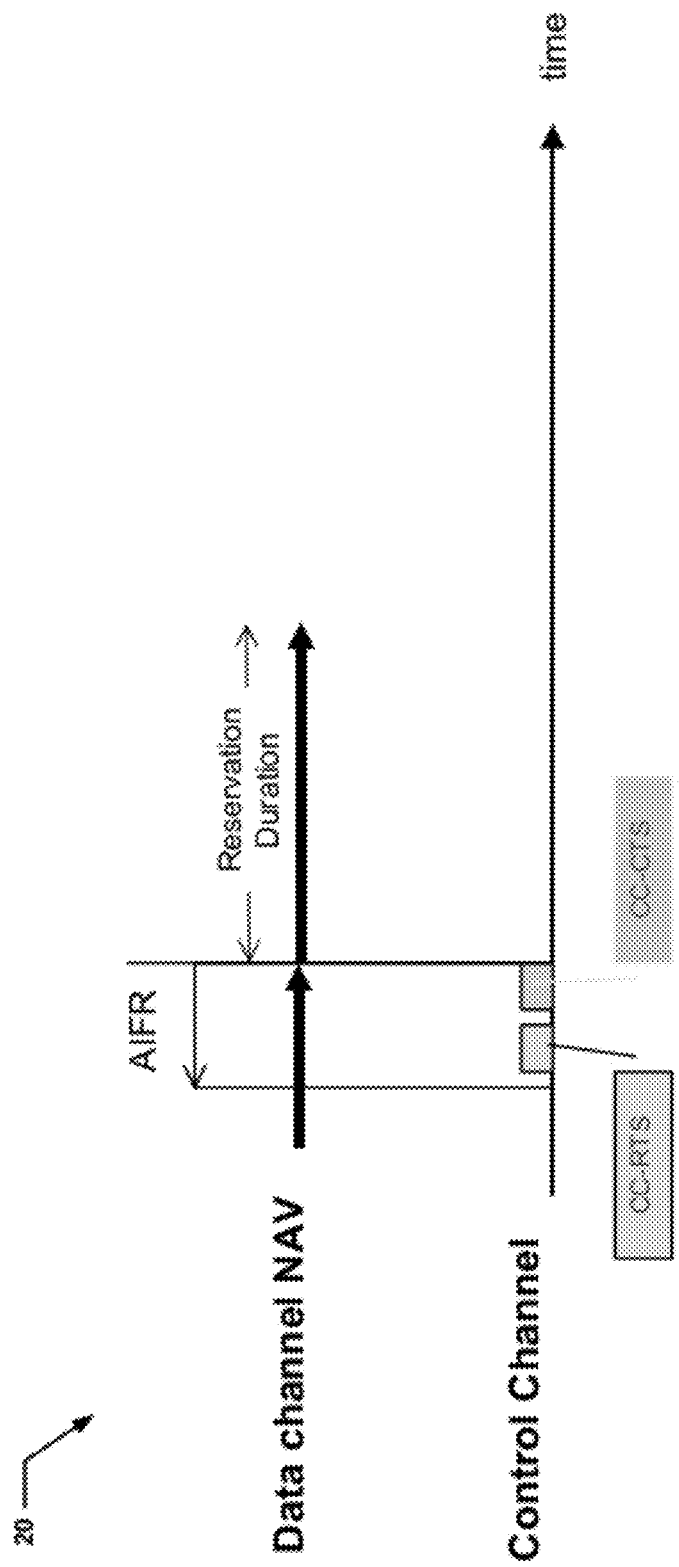
FIG. 2 a diagram showing the timing of multi-channel express forwarding is shown.

Another embodiment involves multi-channel express forwarding. An example is shown in the environment 20 of FIG. 2. When attempting to send a CC-RTS on the Control Channel, a node may not transmit or decrement the back off delay if the data channel being reserved is busy, unless the channel's NAV is due to expire within a time interval equal to AIFR (advance interval for reservation). When responding to a CC-RTS with a CC-CTS, a node must decline the reservation if the indicated data channel is busy, unless the channel's NAV is due to expire within a time interval equal to (AIFR—RTS_Tx Time) [RTS Tx Time is the transmit time of a CC-RTS]. The length of AIFR depends on the access priority of the CC-RTS/CC-CTS. A longer AIFR is used for a higher access priority.

Still another embodiment provides for express forwarding by incorporating the residual lifetime of a frame as part of the determination of the access priority of the frame as the frame traverses the network.

The residual lifetime of a frame (RLT) is the time remaining until the expiration of the frame. When a frame enters a wireless network at a node or portal, the RLT (the age when the frame expires and must be dropped) is added to clock time to produce an expiration time (ET) of the frame. The ET is included in the frame.

At each hop, the residual lifetime is the difference between the expiration time on the received frame and the node clock time. The frame access priority is adjusted in accordance with the residual life of the frame. A frame with a remaining lifetime below a specified threshold will have its priority increased by being designates as a TSQ frame. Br giving higher priority to frames based on age, the delay in traversing the wireless network is reduces which increases throughput and reduces the dropped-frame rate. The highest priority, that is, longest AIFR duration, is used for forwarding TSQ data on a data channel. If a data channel is sought to forward a TSQ frame/TXOP, the CC-RTS is attempted by using the longest AIFR duration. When TSQ data is forwarded on the control channel, the procedure for express forwarding with a single channel is followed.

Figure 3:
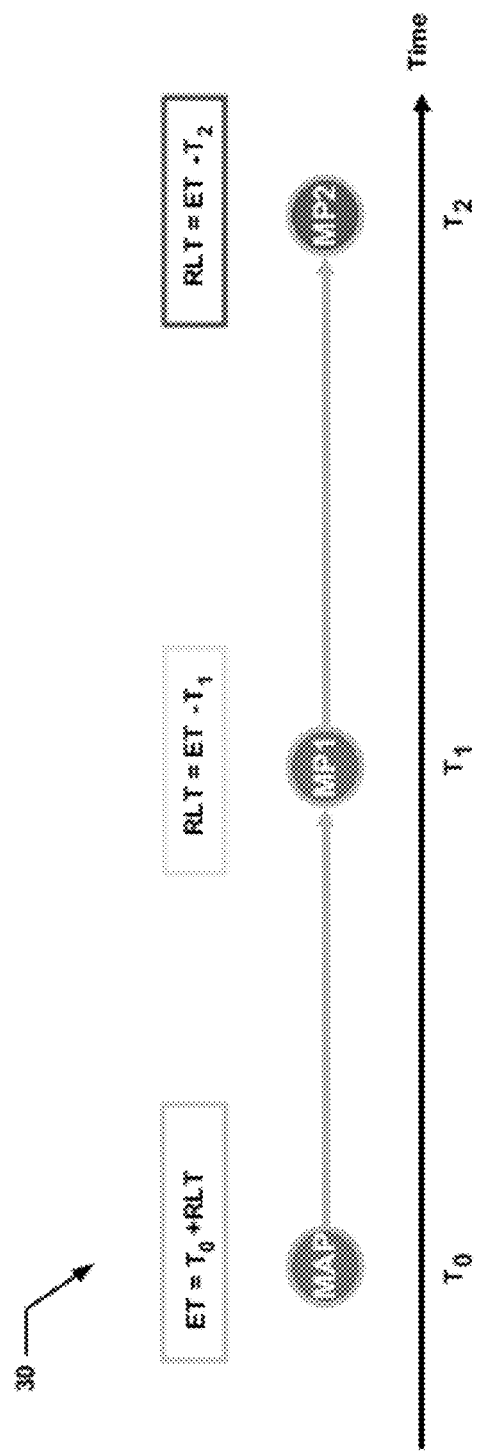
FIG. 3 a block diagram of an environment incorporating express forwarding based on residual lifetime of the frame is shown.

Referring now to FIG. 3, a block diagram of an environment 30 incorporating express forwarding based on residual lifetime of the frame is shown. Environment 30 includes a Mesh Access Point (MAP) in communication with a first Mesh Point (MP1), which in turn is in communication with a second mesh point (MP2). A frame is received at MAP and, as this is where the frame enters the wireless network, the Expiration Time (ET) of the frame is calculated. This calculation involves adding the Residual Lifetime of the frame (RLT) to the clock time at MAP. As shown, this can be written as $ET=T_0+RLT$. The frame is forwarded to the next hop, in this example MP1 (the ET is included in the frame). At MP1, the RLT is determined. IN this instance the RLT is the ET less the clock time at MP1. This can be written as $RLT=ET-T_1$. If this newly calculated RLT where below a predetermined threshold value, this frame would be given a higher priority rate by being designated as a TSQ frame and express forwarded. When the frame is received at the next mesh point MP2, the RLT is recalculated. The RLT at MP2 is now the ET less the clock time at MP2. If this newly calculated RLT where below a predetermined threshold value, this frame would be given a higher priority rate. This cycle of recalculating RLT values at each hop is repeated until the frame exits the wireless network, reaches its destination or expires.

In another embodiment express forwarding can be made less aggressive by postponing it beyond the second hop of a multi-hop transmission. The delay limit can be set according to the user's needs. A hop counter FIN is maintained on the frame; a forwarded frame is not marked TSQ until the hop counter reaches a designated value HNEF. A rough delay estimate is (HNEF+1)*(per hop delay).

The following is an example incorporating a Time-to Live (TTL) value. If express forwarding is engaged after the second hop, HNEF is set to 2.HN equals 1 on the first hop and 2 on the second hop. When the frame is sent on its third hop, the duration value is increased. One can use TTL=# of hops remaining before discarding. HN=dot11MeshTTL−TTL. Hence, the TSQ flag is set when TTL is less than or equal to dot11MeshTTL−HNEF.

An alternate to the above is to use a timer instead of a hop counter. In such an embodiment express forwarding may be postponed until reaching a specified delay since frame initiation. Postponing express forwarding better balances the (express forwarded) traffic on long multi-hop paths with traffic on the shorter paths (which is not express forwarded). As an example, a timer is carried on the frame; a forwarded frame is not marked TSQ, and its Duration value is not increased, until the timer reaches a designated value EFNH (MIB variable dot11MeshEFNH). EFTTL [# of remaining time, TGs draft] is the timer set on frame initiation.

$$Timer = dot11MeshTTL - TTL$$

Hence, the TSQ flag is set when TTL is less than or equal to dot11MeshTTL−EFNH.

Flow charts of the presently disclosed methods are depicted in FIGS. 4-7. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 4:
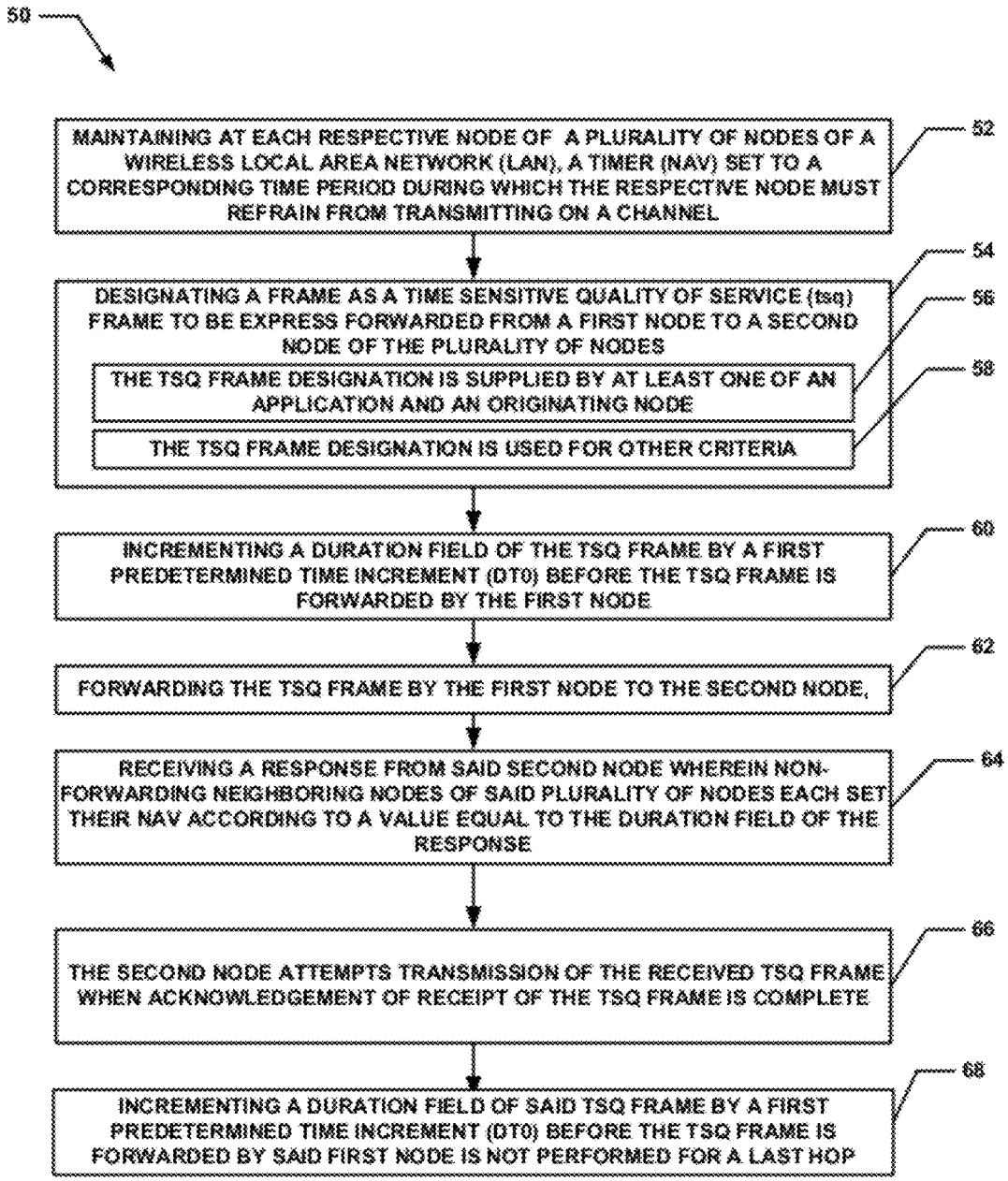
FIG. 4 a flow diagram of a particular embodiment of a method of performing express forwarding in accordance with embodiments the invention is shown.

Referring now to FIG. 4, a particular embodiment of a method 50 of performing express forwarding is shown. Method 50 begins with processing block 52 which discloses maintaining at each respective node of a plurality of nodes of a wireless LAN, a timer (NAV) set to a corresponding time period during which the respective node must refrain from transmitting on a channel.

Processing block 54 states designating a frame as a TSQ frame to be express forwarded from a first node to a second node of the plurality of nodes. As shown in processing block 56 the TSQ frame designation is supplied by at least one of an application and an originating node. As further shown in processing block 58 the TSQ frame designation is used for other criteria.

Processing continues with processing block 60 which recites incrementing a duration field of the TSQ frame by a first predetermined time increment (DT0) before the TSQ frame is forwarded by the first node.

Processing block 62 discloses forwarding the TSQ frame by the first node to the second node. This is then followed by processing block 64 which states receiving a response from the second node wherein non-forwarding neighboring nodes of the plurality of nodes each set their NAV according to a value equal to the duration field of the response.

Processing block 66 recites wherein the second node attempts transmission of the received TSQ frame when acknowledgement of receipt of the TSQ frame is complete.

Processing block 68 discloses wherein the incrementing a duration field of the TSQ frame by a first predetermined time increment (DT0) before the TSQ frame is forwarded by the first node is not performed for a last hop.

Figure 5:
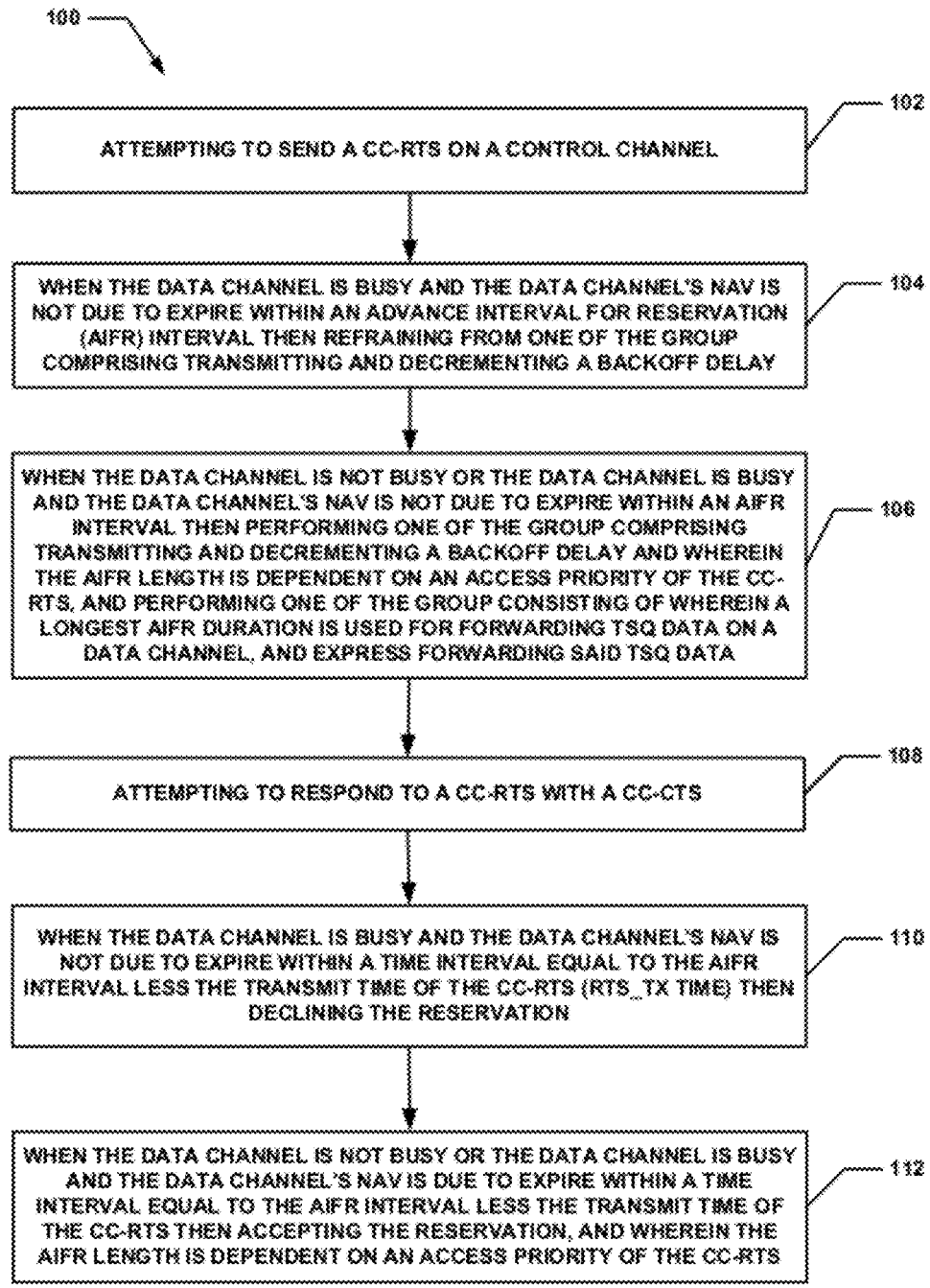
FIG. 5 a flow diagram of a particular embodiment of a method of performing multi-channel express forwarding in accordance with embodiments the invention is shown.

Referring now to FIG. 5, a particular embodiment of a method 100 of performing multi-channel express forwarding in accordance with embodiments the invention is shown. Method 100 begins with processing block 102 which discloses attempting to send a CC-RTS on a control channel.

Processing block 104 states when the data channel is busy and the data channel's NAV is not due to expire within an advance interval for reservation (AIFR) interval then refraining from one of the group comprising transmitting and decrementing a backoff delay.

Processing continues with processing block 106 which states when the data channel is not busy or the data channel is busy and the data channel's NAV is not due to expire within an AIFR interval then performing one of the group comprising transmitting and decrementing a backoff delay and wherein the AIFR length is dependent on an access priority of the CC-RTS, and performing one of the group consisting of wherein a longest AIFR duration is used for forwarding TSQ data on a data channel, and express forwarding the TSQ data.

Processing block 108 discloses attempting to respond to a CC-RTS with a CC-CTS. As shown in processing block 110, when the data channel is busy and the data channel's NAV is not due to expire within a time interval equal to the AIFR interval less the transmit time of the CC-RTS (RTS_Tx Time) then declining the reservation.

Method 100 concludes with processing block 112 which states when the data channel is not busy or the data channel is busy and the data channel's NAV is due to expire within a time interval equal to the AIFR interval less the transmit time of the CC-RTS then accepting the reservation, and wherein said AIFR length is dependent on an access priority of the CC-RTS.

Figure 6:
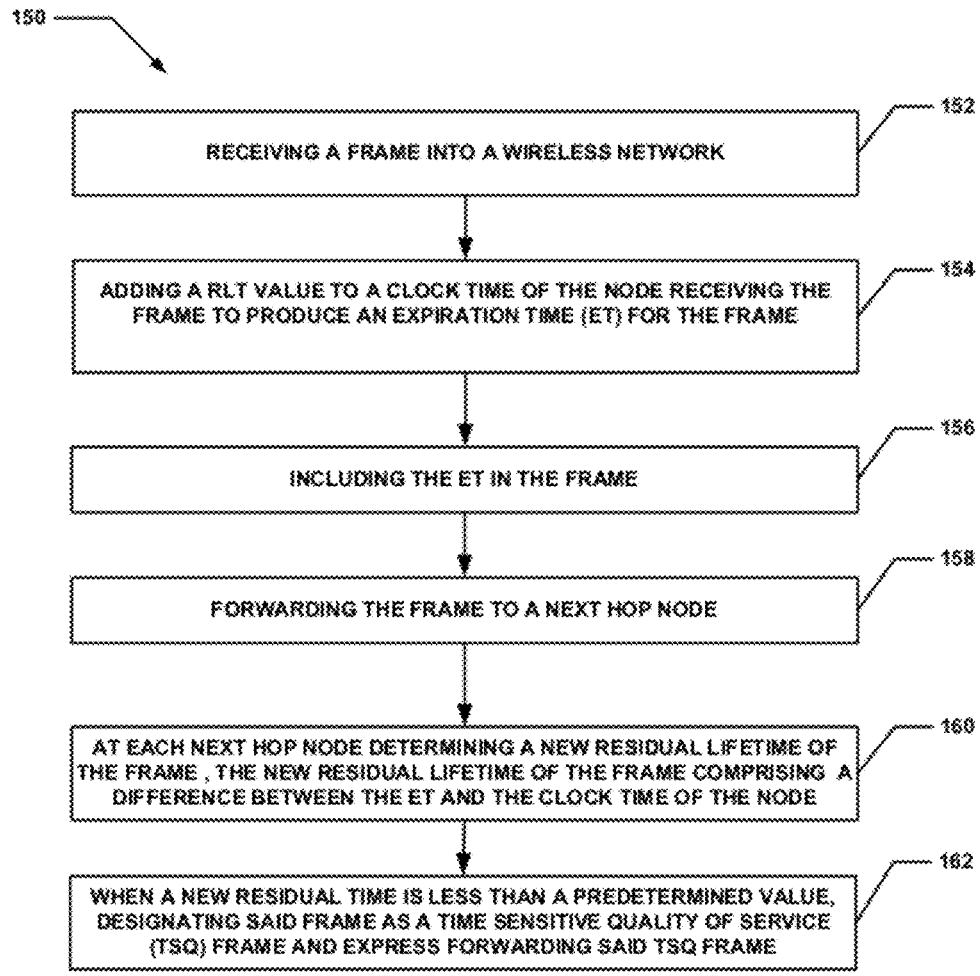
FIG. 6 a flow diagram of a particular embodiment of a method of performing residual lifetime based express forwarding in accordance with embodiments the invention is shown.

Referring now to FIG. 6, a particular embodiment of a method 150 of providing Residual Lifetime (RLT) based express forwarding is shown. Method 150 begins with processing block 153 which discloses receiving a frame into a wireless network.

Processing block 154 states adding a RLT value to a clock time of the node receiving said frame to produce an expiration time (ET) for said frame, and processing block 156 recites including said ET in said frame. Processing block 156 discloses forwarding said frame to a next hop node.

Processing continues with processing block 160 which states at each next hop node determining a new residual lifetime of the frame, the new residual lifetime of said frame comprising a difference between said ET and the clock time of said node. Processing block 162 recites when a new residual time is less than a predetermined value, designating the frame as a Time Sensitive Quality of Service (TSQ) frame and express forwarding the TSQ frame.

Figure 7:
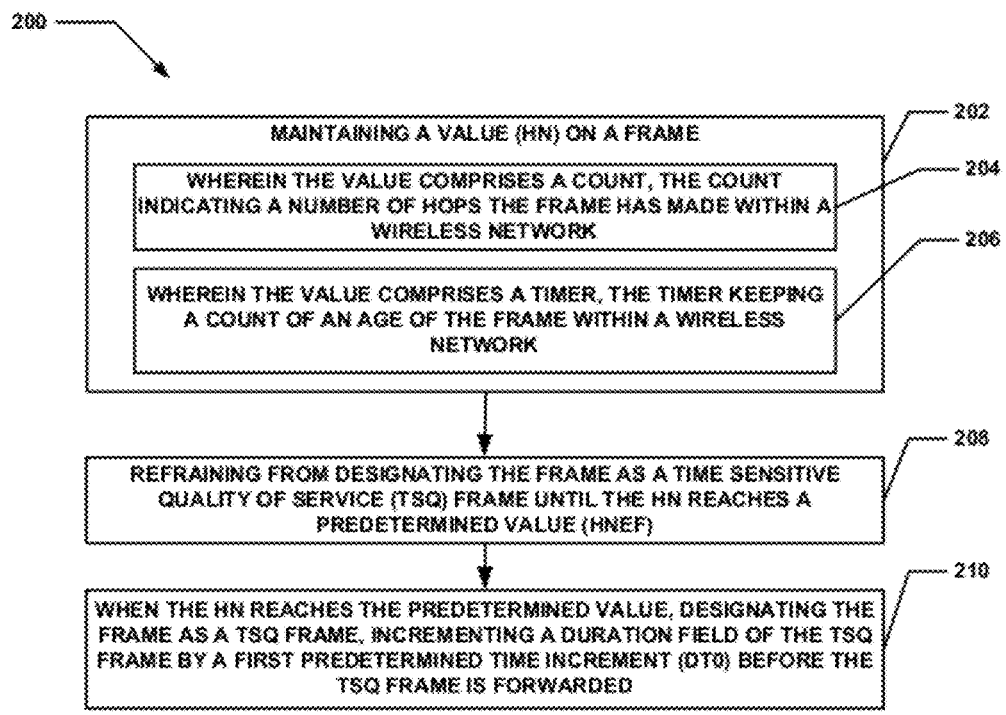
FIG. 7 a flow diagram of a particular embodiment of a method of performing time-to-live based express forwarding in accordance with embodiments the invention is shown.

Referring now to FIG. 7, a particular embodiment of a method 200 of providing Time-to-Live (TTL) based express forwarding is shown. Method 200 begins with processing block 202 which discloses maintaining a value (FIN) on a frame. As shown in processing block 204 said value comprises a count, said count indicating a number of hops said frame has made within a wireless network. Alternately, as shown in processing block 206 the value comprises a timer, the timer keeping a count of an age of the frame within a wireless network.

Processing block 208 states refraining from designating said frame as a Time Sensitive Quality of Service (TSQ) frame until said HN reaches a predetermined value (HNEF). Processing block 210 recites when the FIN reaches the predetermined value, designating the frame as a TSQ frame, and incrementing a duration field of the TSQ frame by a first predetermined time increment (DT0) before the TSQ frame is forwarded.

Figure 8:
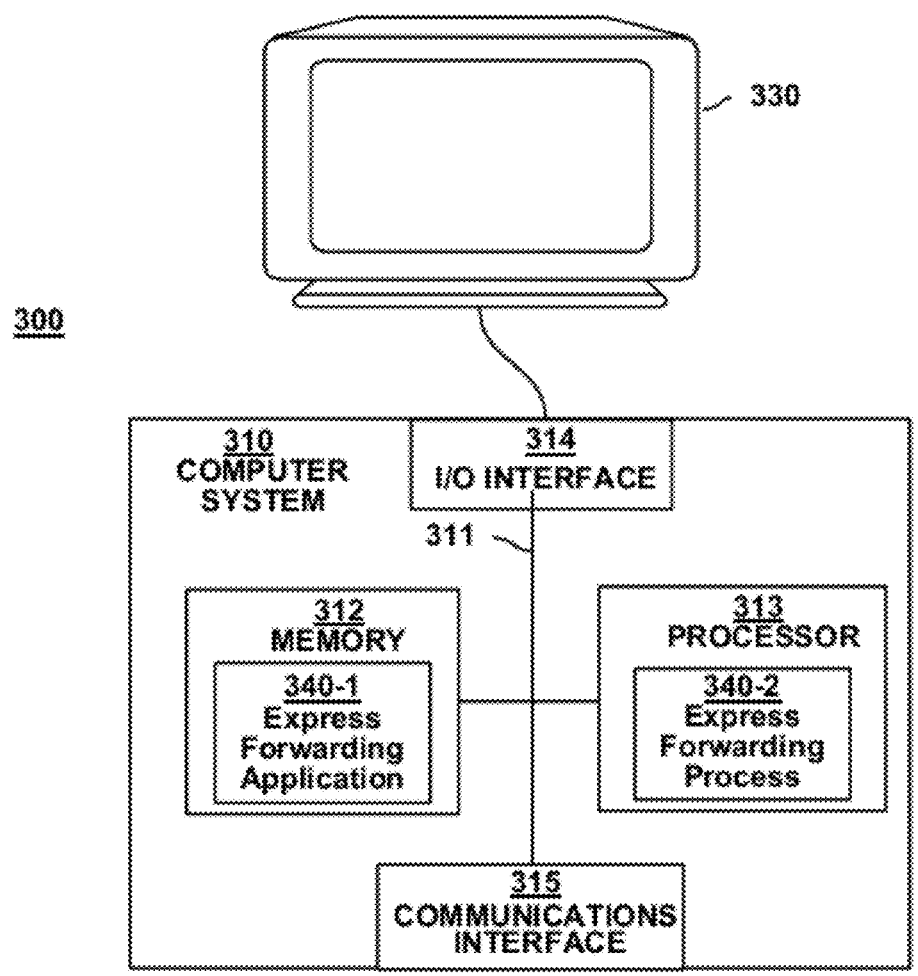
FIG. 8 illustrates an example computer system architecture for a computer system that performs express forwarding in accordance with embodiments of the invention.

FIG. 8 is a block diagram illustrating an example computer system 300 (a node) for implementing express forwarding function 340 and/or other related processes to carry out the different functionality as described herein.

As shown, computer system 300 of the present example includes an interconnect 311 that couples a memory system 312 and a processor 313 an input/output interface 314, and a communications interface 315.

As shown, memory system 312 is encoded with express forwarding application 340-1. Express forwarding application 340-1 can be embodied as software code such as data and/or logic instructions (e.g., code stored in the memory or on another computer readable medium such as a disk) that support functionality according to different embodiments described herein.

During operation, processor 313 of computer system 300 accesses memory system 312 via the interconnect 311 in order to launch, run, execute, interpret or otherwise perform the logic instructions of the express forwarding application 340-1. Execution of express forwarding application 340-1 produces processing functionality in express forwarding process 340-2. In other words, the express forwarding process 340-2 represents one or more portions of the express forwarding application 340-1 (or the entire application) performing within or upon the processor 313 in the computer system 300.

It should be noted that, in addition to the express forwarding process 340-2, embodiments herein include the express forwarding application 340-1 itself (i.e., the un-executed or non-performing logic instructions and/or data). The express forwarding application 340-1 can be stored on a computer readable medium such as a floppy disk, hard disk, or optical medium. The express forwarding application 340-1 can also be stored in a memory type system such as in firmware, read only memory (ROM), or, as in this example, as executable code within the memory system 312 (e.g., within Random Access Memory or RAM).

In addition to these embodiments, it should also be noted that other embodiments herein include the execution of express forwarding application 340-1 in processor 313 as the express forwarding process 340-2. Those skilled in the art will understand that the computer system 300 can include other processes and/or software and hardware components, such as an operating system that controls allocation and use of hardware resources associated with the computer system 300.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
maintaining at each respective node of a plurality of nodes of a wireless Local Area Network (LAN), a timer (NAV) set to a corresponding time period during which the respective node must refrain from transmitting on a channel;
designating a frame as a Time Sensitive Quality of Service (TSQ) frame to be express forwarded from a first node to a second node of said plurality of nodes;
incrementing a duration field of said TSQ frame by a first predetermined time increment (DT0) before the TSQ frame is forwarded by said first node;
forwarding said TSQ frame by said first node to said second node; and
receiving a response from said second node wherein non-forwarding neighboring nodes of said plurality of nodes each set their NAV according to a value equal to the duration field of the response, and wherein said second node attempts transmission of said TSQ frame when acknowledgement of receipt of the TSQ frame is complete.

2. The method of claim 1 wherein said TSQ frame designation is supplied by at least one of an application and an originating node.

3. The method of claim 1 wherein said incrementing a duration field of said TSQ frame by a first predetermined time increment (DT0) before the TSQ frame is forwarded by said first node is not performed for a last hop.

4. The method of claim 1 wherein said duration field comprises a duration time to reserve a channel.

5. A method of providing Time-to-Live (TTL) based express forwarding comprising: maintaining a value (HN) on a frame;
   maintaining at each respective node of a plurality of nodes of a wireless Local Area Network (LAN), a timer (NAV) set to a corresponding time period during which the respective node must refrain from transmitting on a channel; maintaining a value (HN) on a frame;
   refraining from designating said frame as a Time Sensitive Quality of Service (TSQ) frame until said HN reaches a predetermined value (HNEF); and
   when said HN reaches said predetermined value, designating said frame as a TSQ frame, incrementing a duration field of said TSQ frame by a first predetermined time increment (DT0) before the TSQ frame is forwarded;
   forwarding said TSQ frame by said first node to said second node; and
   receiving a response from said second node wherein non-forwarding neighboring nodes of said plurality of nodes each set their NAV according to a value equal to the duration field of the response, and wherein said second node attempts transmission of said TSQ frame when acknowledgement of receipt of the TSQ frame is complete.

6. The method of claim 5 wherein said value comprises a count, said count indicating a number of hops said frame has made within a wireless network.

7. The method of claim 5 wherein said value comprises a timer, said timer keeping a count of an age of said frame within a wireless network.

8. The method of claim 5 wherein said duration field comprises a duration time to reserve a channel.

9. A non-transitory computer readable medium having computer readable code thereon for providing express forwarding of frames, the medium comprising:
   instructions for maintaining at each respective node of a plurality of nodes of a wireless LAN, a timer (NAV) set to a corresponding time period during which the respective node must refrain from transmitting on a channel;
   instructions for designating a Time Sensitive Quality of Service (TSQ) frame to be express forwarded from a first node to a second node of said plurality of nodes;
   instructions for incrementing a duration field of said frame by a first predetermined time increment (DT0) before the TSQ frame is forwarded by said first node;
   instructions for forwarding said TSQ frame by said first node to said second node;
   instructions for receiving a response from said second node wherein non-forwarding neighboring nodes of said plurality of nodes each set their NAV according to a value equal to the duration field of the response and wherein said second node attempts transmission of said received TSQ frame when acknowledgement of receipt of the TSQ frame is complete.

10. The computer readable medium of claim 9 wherein said TSQ frame designation is supplied by at least one of an application and an originating node.

11. The computer readable medium of claim 9 wherein said incrementing a duration field of said TSQ frame by a first predetermined time increment (DT0) before the TSQ frame is forwarded by said first node is not performed for a last hop.

12. The computer readable medium of claim 9 wherein said duration field comprises a duration time to reserve a channel.

13. A non-transitory computer readable medium having computer readable code thereon for providing Time-to-Live (TTL) based express forwarding comprising:
   instructions for maintaining at each respective node of a plurality of nodes of a wireless Local Area Network (LAN), a timer (NAV) set to a corresponding time period during which the respective node must refrain from transmitting on a channel;
   instructions for maintaining a value (HN) on a frame;
   instructions for refraining from designating said frame as a Time Sensitive Quality of Service (TSQ) frame until said HN reaches a predetermined value (HNEF); and
   instructions for when said HN reaches said predetermined value, designating said frame as a TSQ frame, incrementing a duration field of said TSQ frame by a first predetermined time increment (DT0) before the TSQ frame is forwarded;
   instructions for forwarding said TSQ frame by said first node to said second node; and
   instructions for receiving a response from said second node wherein non-forwarding neighboring nodes of said plurality of nodes each set their NAV according to a value equal to the duration field of the response, and wherein said second node attempts transmission of said TSQ frame when acknowledgement of receipt of the TSQ frame is complete.

14. The computer readable medium of claim 13 wherein said value comprises a count, said count indicating a number of hops said frame has made within a wireless network.

15. The computer readable medium of claim 13 wherein said value comprises a timer, said timer keeping a count of an age of said frame within a wireless network.

16. The computer readable medium of claim 13 wherein said duration field comprises a duration time to reserve a channel.

17. A computer system comprising:
   a memory;
   a processor;
   a communications interface;
   an interconnection mechanism coupling the memory, the processor and the communications interface; and
   wherein the memory is encoded with an express forwarding application that when performed on the processor, provides an express forwarding process for processing information, the express forwarding process causing the computer system to be capable of performing the operations of:
   maintaining at each respective node of a plurality of nodes of a wireless LAN, a timer (NAV) set to a corresponding time period during which the respective node must refrain from transmitting on a channel;
   designating a frame as a Time Sensitive Quality of Service (TSQ) frame to be express forwarded from a first node to a second node of said plurality of nodes;
   incrementing a duration field of said frame by a first predetermined time increment (DT0) before the TSQ frame is forwarded by said first node;
   forwarding said TSQ frame by said first node to said second node; and
   receiving a response from said second node wherein non-forwarding neighboring nodes of said plurality of nodes each set their NAV according to a value equal to the duration field of the response and wherein said second node attempts transmission of said TSQ frame when acknowledgement of receipt of the TSQ frame is complete.

18. The computer system of claim 17 wherein said duration field comprises a duration time to reserve a channel.

* * * * *